United States Patent Office 3,177,659
Patented Apr. 13, 1965

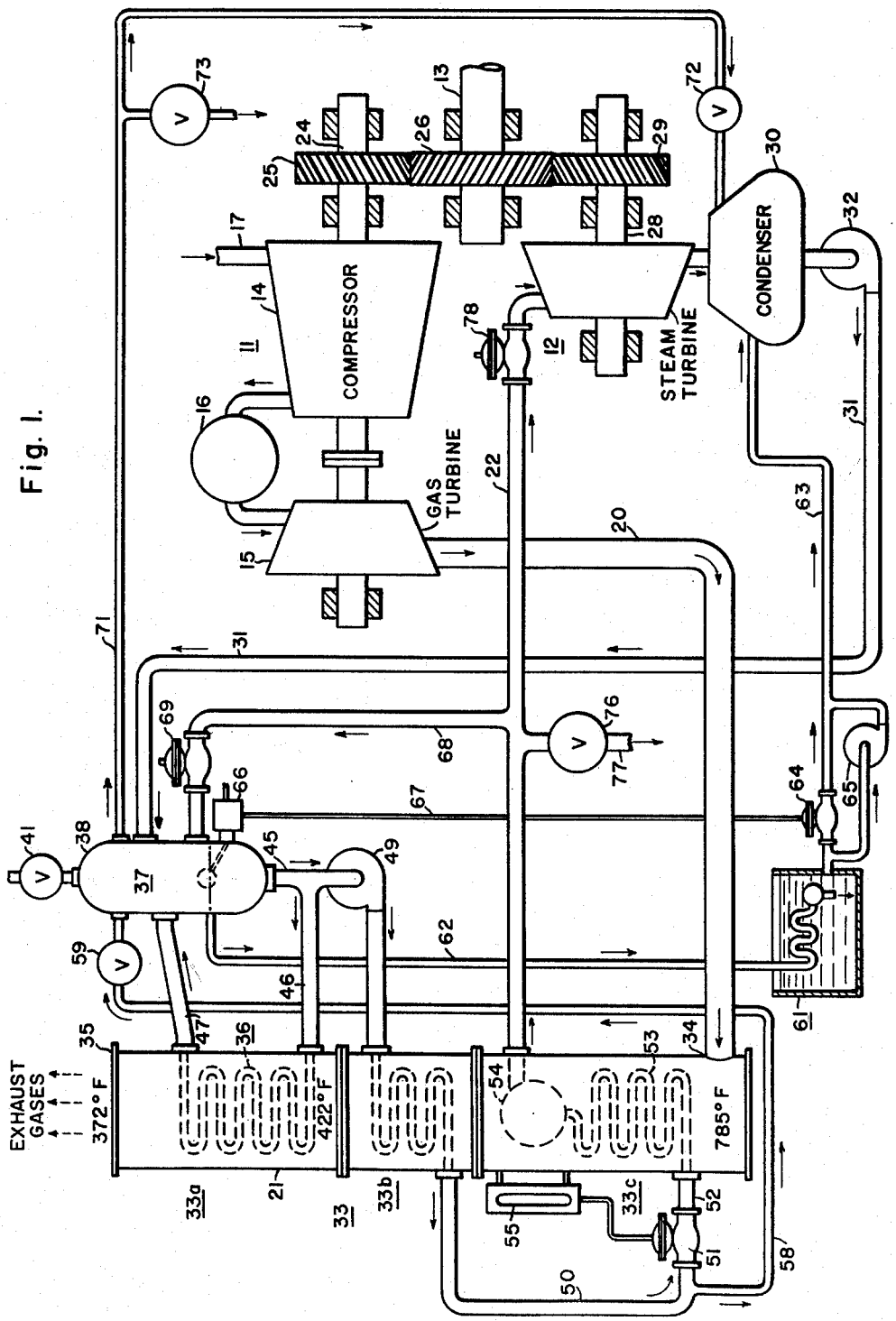

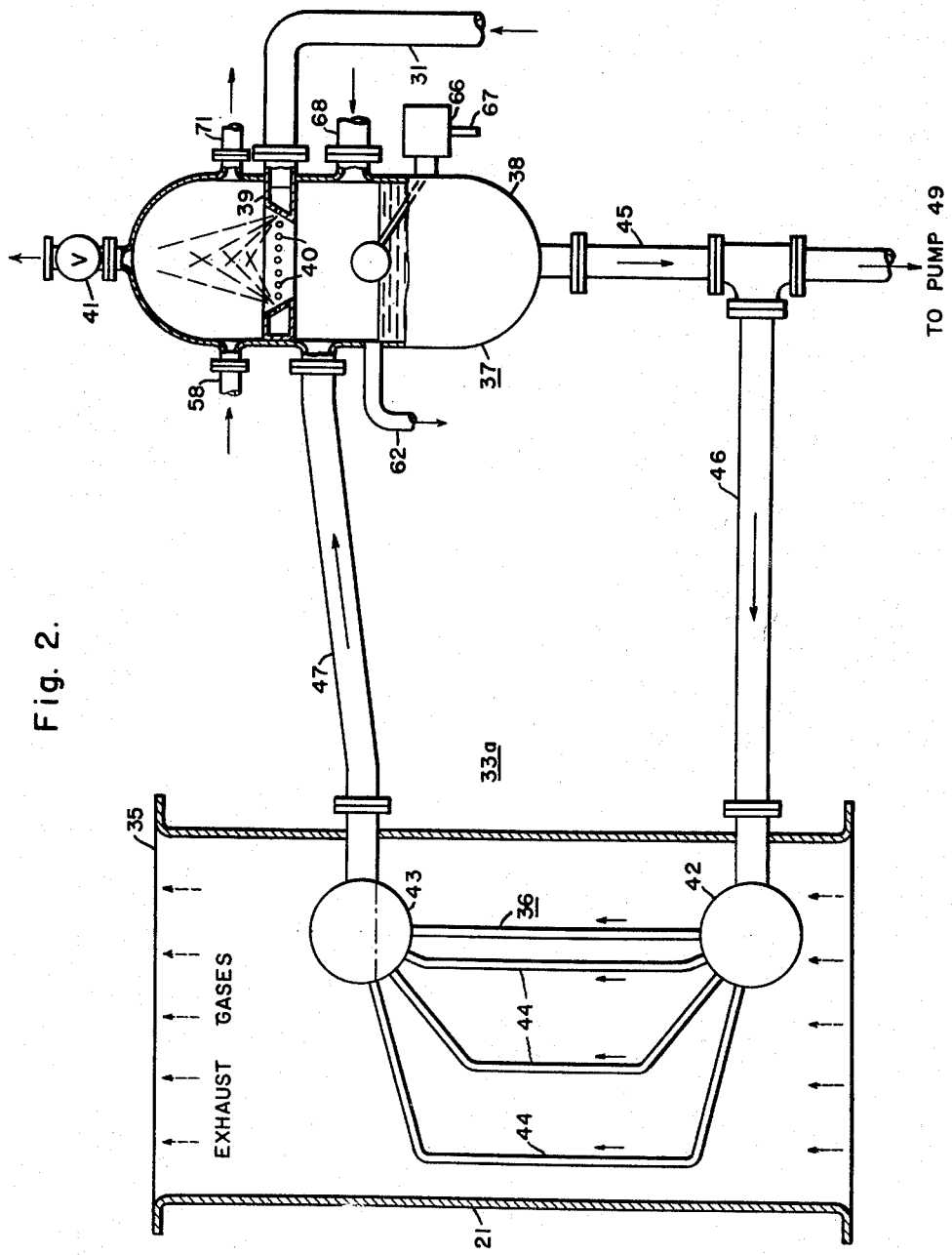

3,177,659
HEAT EXCHANGE APPARATUS
Paul A. Berman, Plymouth Township, Montgomery County, Pa., assignor to Westinghouse Electric Corporation, Pittsburgh, Pa., a corporation of Pennsylvania
Filed Aug. 2, 1962, Ser. No. 214,364
8 Claims. (Cl. 60—39.18)

This invention relates to heat exchange apparatus and more particularly to apparatus for heating liquids by absorption of heat from waste hot gaseous products of combustion.

It is well known to employ heat exchangers to heat liquids by utilizing the otherwise wasted heat in flue gases discharged to the atmosphere. Such heat exchangers are made of metal and disposed in direct contact with the hot stream of gaseous combustion products. Since the gaseous products of combustion contain condensible vapors of corrosive liquids, it is desirable to operate the heat exchanger at a temperature above the dew point of such vapors, so that destructive corrosion of the heat exchanger is minimized.

In view of the above, in apparatus of this type, the relatively cold liquid to be heated in the heat exchanger by the combustion gases is usually preheated in a separate heater, by heated fluid from another supply, from a temperature below the dew point of the combustion gases to a temperature above the dew point before delivery to the heat exchanger, thereby preventing condensation of the corrosive vapors on the heat exchanger.

It is the general object of the invention to utilize otherwise wasted heat in a stream of hot gaseous products of combustion to heat liquid from a temperature below the dew point of corrosive vapors in the products of combustion to a temperature above such dew point, without condensing such corrosive vapors.

Another object is to provide heat exchange apparatus and a method for heating liquid from a temperature below the dew point of corrosive vapors in gaseous combustion products to a higher temperature, which apparatus and method obviate the usually required preheater and permit the heat exchange structure disposed in the combustion gas stream to attain an operating temperature above the dew point temperature of such vapors.

A more specific object of the invention is to provide apparatus and a method for heating and deaerating water by heat exchange with waste hot combustion products, which apparatus is effective to heat the water from a temperature below the dew point of condensible corrosive vapors in the combustion products to a higher temperature, without condensing such vapors on the heat exchange structure disposed in heat transfer relation with the combustion products.

A preferred embodiment of the invention comprises heat recovery apparatus including two heat exchangers, one within the stream of combustion products and the other external thereto. Liquid is circulated through the two heat exchangers in a loop, being heated by the first mentioned heat exchanger. The liquid to be heated is admitted to the external heat exchanger in which it is heated by and mixed with heated fluid coming from the first heat exchanger. A portion of this heated mixture then flows in the loop to the first heat exchanger at a temperature above the dew point of the corrosive vapors and the remainder of the mixture is withdrawn, at the same rate at which liquid to be heated is admitted to the external heat exchanger, to provide a supply of heated liquid.

The apparatus described above may be employed for any desired purpose. However, it is highly desirable for use in combined power plant systems of the type in which a gas turbine unit is employed to provide power and the expanded exhaust gases therefrom are directed to a stack, wherein the otherwise waste heat of the exhaust gases may be recovered, as explained above, to initially heat liquid that is subsequently converted into superheated vapor for motivating a vapor turbine to provide additional power. Although such combined power plants are generally well known in the art, the incorporation of the heat recovery apparatus forming this invention results in operating economies and more efficient operation of the combined power plant.

The above and other objects are effected by the invention as will be apparent from the following description and claims taken in connection with the accompanying drawings, forming a part of this application, in which:

FIGURE 1 is a diagrammatic view of a combined steam and gas turbine power plant having heat exchange apparatus in accordance with the invention incorporated therein; and FIG. 2 is an enlarged diagrammatic view of a portion of the heat exchange apparatus forming a part of this invention.

Referring to the drawings in detail, in FIG. 1 there is shown a combined cycle power plant of the type having a gas turbine unit 11 and a steam turbine unit 12 for jointly driving a power output shaft 13 connected to a suitable load device (not shown) such as an electrical generator, ship's propeller or the like.

Combined cycle power plants of this type are generally well known and, as illustrated herein, the gas turbine unit 11 includes the usual air compressor 14 drivenly connected to a gas turbine 15 and having a fuel combustor 16 for providing hot motive gaseous products of combustion to the gas turbine 15. The compressor 14 is provided with the usual intake opening 17 for admitting air to the compressor 14, wherein it is pressurized to a suitable degree and is then directed to the fuel combustor 16 to support fuel combustion therein. After expansion in the gas turbine 15, the hot vitiated exhaust gas stream is directed therefrom through an exhaust conduit 20 to a suitable flue or exhaust stack 21 and dissipated to the atmosphere.

The waste flue gases contain a large amount of energy in the form of sensible heat that is usually employed in combined cycle power plants of this type to heat liquid into superheated vapor, for example, water into steam, for motivating the steam turbine unit 12, thereby recovering some of the otherwise wasted heat as power. This superheated steam is directed to the steam turbine through a steam conduit 22 at a variable rate, as required for varying load conditions. As the steam is expanded in the steam turbine 12, the power generated therein may be employed to assist in driving the main power output shaft 13.

In the illustration, the gas turbine unit is provided with an output shaft 24 having a gear 25 disposed in driving relation with a reduction gear 26 disposed on the main power output shaft 13 and, the steam turbine unit 12 is provided with an output shaft 28 having a gear 29 also disposed in driving relation with the reduction gear 26.

After expansion of the steam in the steam turbine 12, the thus vitiated steam is directed into a suitable condenser 30, wherein it is condensed into water and then withdrawn therefrom through a suitable boiler feed water conduit 31 by a feed water pump 32.

In accordance with the invention, the feed water directed from the condenser 30 by the feed water conduit 31 is reheated by stages into superheated steam, for reemployment in the steam turbine 12, by heat exchange apparatus disposed in operative relation with the exhaust stack 21, and generally designated 33. The heat exchange apparatus 33 includes heat exchanger structure 33a for initially preheating the feed water from a temperature below the dew point of the condensible corrosive vapors in the exhaust gases to a temperature above the dew point of the corrosive vapors without change in phase, an economizer 33b, for heating the water to the vaporization temperature, and a waste heat boiler 33c for converting the water to superheated steam. The superheated steam is then directed through the steam inlet conduit 22 for expansion in the steam turbine unit 12, thereby completing the steam circuit.

As illustrated in FIG. 1, the exhaust gases from the gas turbine 15 are directed by the conduit 20 into the lower part of the exhaust stack 21, as indicated at 34, and exhausted to the atmosphere at the upper portion of the stack as indicated at 35. Accordingly, the waste heat boiler 33c extracts heat from the gases at the highest temperature value, the economizer 33b extracts heat from the exhaust gases at an intermediate value, while the heat exchange structure 33a extracts heat from the exhaust gases at the lowest value.

As more fully shown in FIG. 2, the heat exchanger structure 33a includes a first heat exchanger 36 disposed in the stack 21 and a second heat exchanger or water heater 37 disposed externally of the stack. The heater 37 is of the direct contact fluid-to-fluid type and includes a shell or tank 38 having an inlet to which the feed water conduit 31 is connected. A spray nozzle or spray means 39 of any suitable type is disposed in the tank 38 and connected to the feed water conduit 31 in such a manner that as the feed water is admitted thereto, it sprays into the tank 38 in an upwardly directed spray pattern, as indicated by the dash lines, through a plurality of apertures 40. As illustrated, the spray nozzle 39 is of annular shape and the apertures 40 are disposed along the circumferential inner periphery thereof. The heater tank 38 may be of any suitable shape. However, as illustrated, it is of generally cylindrical shape with its longitudinal axis disposed vertically and, in the upper portion of the tank 38 there is provided a valve 41 for venting air or other noncondensible gases from the tank.

The first heat exchanger 36 is of the surface type and includes lower and upper manifolds 42 and 43, respectively, disposed in vertically spaced relation with each other and connected to each other by a plurality of vertically extending heat exchanger tubes 44 disposed in the flow path of the exhaust gases and in good heat exchange relation therewith.

The heat exchanger 36 and the water heater 37 are connected to each other by conduit structures 45, 46 and 47 arranged in a loop. The conduits 45 and 46 provide communication between the lower part of the heater tank 38 and the manifold 42, while the conduit 47 provides communication between manifold 43 and an intermediate region of the heater tank 38. Accordingly, the water admitted to the heater 37 flows downwardly through the conduit 45 and thence into the conduit 46 to the manifold 42, wherein it divides and is fed upwardly through the tubes 44, heated to the saturated steam temperature with no increase in pressure and collected in the manifold 43. The saturated steam is then directed into the tank 38, wherein it is intermingled with the incoming feed water spray.

The conduit 45 is also disposed in communication with a pump 49, hereinafter termed a boiler feed pump, having its outlet connected to the economizer 33b and effective to increase the pressure of the water. The pump 49 may be of any suitable type effective to vary the flow rate in accordance with pump discharge pressure, for example a centrifugal pump driven at constant speed. The economizer 33b is connected to the waste heat boiler 33c by a conduit 50 having a boiler injection valve 51 interposed therein and connected to the waste heat boiler 33c by a conduit 52.

The waste heat boiler 33c includes a heat exchange tube structure 53 and a steam drum 54 disposed above the tube structure 53 and connected thereto. Steam is generated in the tube structure 53, as the liquid flows upwardly therethrough, and is collected in the steam drum 54. The steam drum 54 is connected to the turbine steam inlet conduit 22 to complete the steam loop, as previously described.

A suitable liquid level sensing device 55 is employed to sense the level of the water in the stream drum 54 and is effective upon rise in level of the water in the steam drum 54 to regulate the injection control valve 51 in closing direction. Conversely, as the water level drops, the liquid level sensing device 55 is effective to actuate the control valve 51 in opening direction. As well known in the art, the variation in the height of the level in the steam drum 54 is occasioned by the varying demand for steam.

The conduit 50 is also connected to the heater 37 by a conduit 58 disposed in bypass relation to the waste heat boiler 33c and having a pressure relief valve 59 interposed therein. The relief valve 59 is so designed that, at the pressure prevailing during normal operation, about 10% of the water flow through the conduit 50 is returned through conduit 58 to the feed water heater 37.

There may be further provided a suitable makeup tank structure 61 having a conduit 62 communicating with the lower portion of the water heater 37 for supplying pure makeup water to the tank 61 for augmenting the quantity of water in the steam cycle, when and as required, due to partial depletion in the circuit. The makeup tank 61 is connected to the steam condenser 30 by a conduit 63 having a makeup control valve 64 interposed therein to regulate rate of flow of makeup water, as required. There is also provided a pump 65 disposed in parallel with the valve 64 for controlling the rate at which makeup water is introduced to the system, as required, during initial start up.

During operation, as the valve 64 is moved in opening direction, under the control of a suitable liquid level sensing device 66 disposed in the feed water heater tank 38, the water is aspirated into the condenser 30 by the suction prevailing therein. The makeup valve 64 may be of the hydraulically actuated type and controlled by the liquid level sensing device 66, as indicated by the hydraulic conduit 67.

During initial start up, when no suction prevails in the condenser 30, the pump 65 may be energized to force feed the makeup water through conduit 63 to the condenser, if required.

A conduit 68 having one end disposed in communication with the steam turbine supply conduit 22 and its other end disposed in communication with the feed water heater tank 38 is further provided. This conduit 68, has a pressure regulating valve 69 interposed therein and arranged in such a manner that, when the pressure in the feed water heater tank 38 drops below a predetermined value, the valve initiates flow of superheated steam from the conduit 22 into the feed water heater tank to restore the pressure.

A conduit 71, having interposed therein a suitable pressure relief valve 72 may be employed to connect the upper portion of the heater tank 38 to the steam condenser 30 for bleeding excess low pressure saturated steam, during periods of low demand for steam by the turbine 12. Also, if desired, a manually or otherwise operable valve 73 may be associated with conduit 71 for bleeding the excess low pressure steam from the system for other purposes.

During operation, with the gas turbine unit 11 and the steam turbine unit 12 jointly driving the output power shaft 13 to energize a load (not shown), expanded steam is continuously exhausted from the steam turbine 12 to the condenser 30, condensed therein to maintain the required turbine exhaust vacuum and pumped into the feed water heater 37 through the conduit 31.

Hereinafter, representative temperature values will be given by way of example, and not limitation, to facilitate explanation. For example, the feed water may be delivered to the heater 37 at about 92° F. At the same time, the expanded motive gaseous products of combustion exhausted from the gas turbine 12 are directed into the exhaust stack 21 through the exhaust conduit 20.

The exhaust gases are initially directed into the lowermost portion 34 of the stack 21 at a temperature of about 785° F., and as they progress up through the stack 21 and transfer some of their heat to the waste heat boiler 33c and the economizer 33b, they are reduced in temperature to a value of about 422° F. Accordingly, the heat exchange structure 33a is effective to extract residual heat from the exhaust gases at their lowest temperature level and to initially heat the feed water from the condenser at the lowest temperature value in the steam cycle.

As the feed water is sprayed into the feed water heater tank 38 at a first rate of flow by the spray means 39, a liquid level of water is attained in the tank 38 and a portion of the water from the bottom of the tank is continuously recirculated at a second and lower rate of flow through the first heat exchanger 36 and the feed water heater 37 in a loop including conduits 45 and 46, manifold 42, heater tubes 44, manifold 43 and conduit 47.

During circulatory flow through the first heat exchanger 36, the feed water is evaporated at a higher temperature than the condensation or dew point of the corrosive condensable vapors in the flue gases and is converted into saturated steam, without increase in pressure, before returning to the feed water heater. Accordingly, all of the heat absorbed by the first heat exchanger 36 is employed as latent heat of vaporization and is not employed to superheat the resulting steam. As the thus generated low pressure saturated steam is returned to the feed water heater 37 from the heat exchanger 36 it intermingles with the issuing spray of feed water from the spray means 41, thereby to heat the issuing feed water by direct contact to form a heated water mixture in the lower portion of the tank.

As the finely divided water spray is heated by the latent heat of the steam, the steam being condensible is substantially converted into water and joins the heated water mixture. However, the feed water may contain some air or other non-condensible gases that become heated by the steam. These gases are bled to the atmosphere through the bleed valve 41, thereby effectively deaerating the heated feed water.

By disposing the heat exchanger 36 at substantially the same level as the feed water heater 37, a suitable column or level of water is maintained in the heat exchanger 36, as required for optimum heat exchange. This level, as indicated by the horizontal dot and dash line in the upper manifold 43, is substantially equal to the liquid column or level in the heater tank 38 and promotes the circulatory flow. As illustrated, conduit 47 is inclined upwardly (left to right) and acts as a steam riser tube, while the upper or unflooded portion of the feed water heater tank 38 acts as a steam drum for the heat exchanger 36.

As steam is generated in the first heat exchanger 36, the flue gases are reduced in temperature from a value of about 422° F. to a value of about 372° F., and the steam is generated at a temperature of about 240° F. Hence, the operating temperature of the first heat exchanger is about 240° F., well above the dew point of condensible vapors in the flue gases. The latent heat energy in the steam thus generated is effective to heat the feed water in the feed water heater 37 to a temperature of about 240° F. and the thus heated water is drawn therefrom at substantially the first rate of flow by the boiler feed pump 49, pressurized and directed into the economizer 33b. As the thus preheated feed water flows through the economizer 33b, it is heated to a higher temperature. As well known in the art, it is desirable to avoid generation of steam in the economizer. Since the flow rate through the economizer is relatively high and the boiler feed pump 49 maintains pressurization on the water flow therethrough, vaporization in the economizer during load conditions on the steam turbine 12 is minimized. The thus further heated and pressurized water is then directed to the waste heat boiler 33c through the conuit 50, the boiler injection valve 51 and conduit 52 and is converted into superheated steam at the pressurization value determined by the boiler feed pump 49.

During operation at part or a minimum load on the steam turbine unit 12, its demand for steam is reduced, and, accordingly, the flow rate of steam therethrough is reduced, thereby causing the water level in the steam drum 54 of the waste heat boiler to rise to a higher level. As the water level rises in the steam drum 54, this condition is sensed by the liquid level sensing means 55 which, in turn, is effective to move the boiler injection control valve 51 in closing direction, thereby reducing the flow of water through the waste heat boiler 33c. As the control valve 56 is moved in closing direction, the restriction in such flow is sensed by the boiler feed pump 49, and the pressure at the discharge of the boiler feed pump increases accordingly. As the pressurization of the water flowing through the conduit 50 increases, the relief valve 59 is automatically opened to a greater degree, thereby diverting the excess water to the feed water heater 37. The thus diverted feed water mingles with the steam and water spray therein, thereby augmenting the heating effect of the steam from the first heat exchanger 36 on the feed water in the feed water heater. Accordingly, some of the excess low pressure steam may not be condensed and the pressure in the heater tank may rise. As the steam pressure rises, the pressure relief valve 72 automatically moves in opening direction to bleed the excess steam through conduit 71 into the steam condenser 30, where it is condensed and returned to the feed water circuit by the feed water pump 32. This circuit may be employed when no other use for the steam is desired. However, the excess saturated steam may be removed from the system through the conduit 71 to operate auxiliary apparatus (such as space heaters, fuel heaters, absorption refrigerators, etc.) by opening the valve 73.

With this arrangement, during periods of low steam demand by the turbine, the reduction in flow of the heated water through the waste heat boiler 33c has no adverse effects upon operation of the economizer 33b, since the water that is thus restrained from flowing therethrough is automatically bypassed into the feed water heater in a safe and efficient manner. Hence, flow through the economizer 33b is maintained at the usual or normal rate and the normal dwell time of the water in the economizer is not exceeded, thereby preventing steam generation within the economizer and "water hammer," with the attendant reduction in efficiency that would otherwise be occasioned.

The relief valve 59, imposes a back pressure tending to increase the pressure of the water flow through the economizer as the boiler injection valve 51 is moved in closing direction, and this increase in pressurization is also effective to minimize steam generation in the economizer 33b. In addition thereto, the increase in the boiler feed pump discharge pressure is effective to reduce the flow through the feed pump, thereby providing a balance between the economizer pressure and flow through the economizer to obtain maximum cycle efficiency.

In the event that a need exists for superheated steam for auxiliary uses and purposes, this superheated steam may be removed from the system at constant pressure by opening a manually or otherwise operable valve 76 disposed in a conduit 77 connected in parallel with the turbine inlet conduit 22 upstream of a pressure regulating valve 78. During diversion of the superheated steam for such auxiliary uses, the liquid level in the steam drum 54 may be maintained at a level to maintain the boiler injection valve 51 in substantially fully open position, thereby minimizing the diversion of heated feed water through conduit 58 to the feed water heater 37.

Conversely, if a need exists for both superheated steam and low pressure saturated steam, during operation of the steam turbine unit 12 at low load conditions, the valves 76 and 73 may both be opened to permit more diversion of such steam from the system for use, and the flow through the waste heat boiler 33c is automatically adjusted by the injection valve 51 to suit such auxiliary requirements.

In the event that the conduit 77 is not provided, the pressure regulating valve 78 is preferably omitted, thereby improving the steam cycle efficiency at part load, since the boiler pressure would decrease with load and more steam would be generated.

It will now be seen that the invention provides heat exchange apparatus for heating liquids by absorption of heat from waste hot gaseous products of combustion in a highly efficient manner and effective to utilize a relatively large portion of the otherwise wasted heat energy contained in the exhaust gases.

It will further be seen that the invention provides waste heat exchange apparatus effective to heat a liquid from a temperature below the dew point of the condensible hot gaseous products of combustion to a temperature above the dew point of the condensible gases without the formation of condensate on the heat exchange structure disposed in the stream of the exhaust gases.

In addition to the above, the invention provides heat exchange apparatus including an arrangement and method for employing an economizer in such a manner that steam generation within the economizer is prevented during periods of low demand, as well as high demand, on the system without the necessity for bypassing the flue gases around the economizer. In this connection, in the prior art, to avoid steaming in the economizer during operation of the system at low load requirements, bypass arrangements have been provided to divert the flow of exhaust gases around the economizer, thereby to minimize the heat exchange between the exhaust gases and the economizer surfaces during such periods.

While the invention has been shown in but one form, it will be obvious to those skilled in the art that it is not so limited, but is susceptible to various changes and modifications without departing from the spirit thereof.

I claim as my invention:

1. In combination:
   fuel combustion means forming gaseous products of combustion,
   means defining a passageway for exhausting the products of combustion from said fuel combustion means,
   a first heat exchanger disposed in said passageway and having a plurality of liquid conducting tubes for transferring heat from said combustion products to a liquid and effective to vaporize the liquid,
   a second heat exchanger of the direct contact fluid-to-fluid type disposed externally of said passageway and including a shell structure,
   means for admitting a liquid at a first temperature to said shell structure,
   conduit means providing a liquid communication between said shell structure and said tubes, whereby the vapor generated in said first heat exchanger is continuously intermingled with the liquid in said second heat exchanger to provide a heated mixture at a second and higher temperature,
   said shell structure and said tubes being disposed in a manner to permit the liquid therein to attain substantially the same level,
   said conduit means recirculating a portion of the heated mixture through said tubes, and
   means for withdrawing the remainder of the heated mixture from said shell.

2. In combination:
   fuel combustion apparatus,
   means defining a passageway for exhausting a stream of gaseous products of combustion from said fuel combustion apparatus,
   a first heat exchanger,
   an economizer,
   said first heat exchanger and said economizer being disposed in said passageway for absorbing heat from said combustion products,
   said economizer being disposed upstream of said first heat exchanger with regard to the flow of the combustion products and exposed to the combustion products at a higher temperature than said first heat exchanger,
   means defining a second heat exchanger of the direct contact fluid-to-fluid type disposed externally of said passageway,
   means for admitting a relatively cool liquid at a first rate and at a first temperature to said second heat exchanger,
   means for circulating a portion of the liquid at a second and lower rate in a loop circuit from said second heat exchanger through said first heat exchanger,
   said first heat exchanger being continuously operable at a second temperature higher than said first temperature and providing heated vapor to said second heat exchanger,
   means for mixing the heated vapor and the liquid in said second heat exchanger, whereby a heated liquid mixture is attained,
   means for withdrawing the heated liquid mixture from said second heat exchanger at said first rate, and
   means including a pump for pressurizing and pumping the heated liquid mixture through said economizer,
   said economizer being effective to heat the heated liquid mixture to a third and higher temperature than said second temperature.

3. A combined power plant system comprising:
   a first power turbine unit motivated by hot gaseous products of combustion,
   means defining a passageway for exhausting the gaseous products of combustion from said first turbine to the atmosphere,
   a second power turbine unit motivated by superheated vapor,
   means for condensing into liquid the vapor exhausted by said second turbine; and
   heat exchange apparatus associated with said passageway for reconverting said liquid into superheated vapor at a variable rate, as required by said second turbine,
   said heat exchange apparatus comprising first heat exchanger structure for heating said liquid to a first temperature,
   said first heat exchanger structure including a shell,
   means for conducting the liquid from the condenser to said shell,
   an economizer for heating said liquid from said first temperature to a second and higher temperature,
   means interposed between said first heat exchanger structure and said economizer for pressurizing said liquid,
   a boiler for heating the pressurized liquid from said economizer and generating superheated vapor for said second turbine,
   first conduit structure connecting said economizer and said boiler,
   a regulating valve interposed in said first conduit for regulating the rate of liquid injection into said boiler for vapor generation,
   means responsive to liquid level in said boiler for controlling said regulating valve,
   second conduit structure connecting said shell to said first conduit structure upstream of said regulating valve, and
   a pressure relief valve interposed in said second conduit structure, said pressure relief valve being effective to move in opening direction in response to increase in pressure of the liquid in said first and second conduits to direct liquid from said boiler to said first heat exchanger, said regulating valve being movable in closing direction by said liquid level responsive means in response to reduction in liquid level in said boiler, and said regulating valve being effective to increase the liquid pressure in said conduits upon movement in closing direction.

4. The structure recited in claim 3 and further including, a third conduit structure connected to said shell for withdrawing therefrom excess vapor generated therein, and valve means for regulating the withdrawal of said excess vapor from said shell.

5. The method of heating pressurized liquid by absorption of heat from a stream of hot gaseous products of combustion having a dew point, which method comprises, spraying the liquid at a first rate and at a temperature below the dew point of said gaseous products into a direct contact fluid-to-fluid heater disposed out of contact with said gaseous products, diverting a portion of said liquid from a lower portion of said heater to the lower portion of a heat exchanger disposed in the stream of said gaseous products to substantially convert said portion to saturated vapor with substantially no increase in pressure, directing said saturated vapor into said heater to form a heated mixture in the heater, recirculating a portion of said heated mixture at a second and lower rate of flow through said heat exchanger in a manner to maintain said heat exchanger at a temperature above the dew point of said gaseous products, and withdrawing the remainder of said heated mixture from said heater at said first rate.

6. In combination:

fuel combustion means forming gaseous products of combustion, means defining a passageway for exhausting the products of combustion from said fuel combustion means, a first heat exchanger disposed in said passageway and having a plurality of liquid conducting tubes for transferring heat from said combustion products to a liquid and effective to vaporize the liquid, a second heat exchanger of the direct contact fluid-to-fluid type disposed externally of said passageway and including a shell structure, means for admitting a liquid, at a first temperature to said shell structure, conduit means providing a liquid communication between said shell structure and said tubes, whereby the vapor generated in said first heat exchanger is continuously intermingled with the liquid in said second heat exchanger to provide a heated mixture at a second and higher temperature and excess vapor, said shell structure and said tubes being disposed in a manner to permit the liquid therein to attain substantially the same level, said conduit means recirculating a portion of the heated mixture through said tubes, means for withdrawing another portion of the heated mixture from said shell, and means for withdrawing the excess vapor from said shell.

7. In combination:

fuel combustion apparatus, means defining a passageway for exhausting a stream of gaseous products of combustion from said fuel combustion apparatus, a first heat exchanger, an economizer, said first heat exchanger and said economizer being disposed in said passageway for absorbing heat from said combustion products, said economizer being disposed upstream of said first heat exchanger with regard to the flow of the combustion products and exposed to the combustion products at a higher temperature than said first heat exchanger, means defining a second heat exchanger of the direct contact fluid-to-fluid type disposed externally of said passageway, means for admitting a relatively cool liquid at a first temperature to said second heat exchanger, means for circulating a portion of the liquid in a loop circuit from said second heat exchanger through said first heat exchanger, said first heat exchanger being continuously operable at a second temperature higher than said first temperature and providing heated vapor to said second heat exchanger, means for directing the heated vapor into said second heat exchanger, whereby a heated liquid mixture and excess vapor is attained, means for withdrawing the heated liquid mixture from said second heat exchanger, means for withdrawing the excess vapor from said second heat exchanger, and means including a pump for pressurizing and pumping the heated liquid mixture through said economizer, said economizer being effective to heat the heated liquid mixture to a third and higher temperature than said second temperature.

8. The method of heating pressurized liquid by absorption of heat from a stream of hot gaseous products of combustion having a dew point, which method comprises, spraying the liquid at a first rate and at a temperature below the dew point of said gaseous products into a direct contact fluid-to-fluid heater disposed out of contact with said gaseous products, diverting a portion of said liquid from a lower portion of said heater to the lower portion of a heat exchanger disposed in the stream of said gaseous products to substantially convert said portion to saturated vapor with substantially no increase in pressure, directing said saturated vapor into said heater thereby forming a heated mixture in the heater, recirculating a portion of said heated mixture at a second rate of flow through said heat exchanger in a manner to maintain said heat exchanger at a temperature above the dew point of said gaseous products, withdrawing another portion of said heated mixture from a lower portion of said heater, and withdrawing vapor from the upper portion of said heater.

References Cited by the Examiner

UNITED STATES PATENTS

| 1,860,363 | 5/32 | La Mont | 122—407 |
| 1,948,524 | 2/34 | Kerr | 122—438 |
| 2,433,547 | 12/47 | Dalin et al. | 122—7 |
| 2,823,650 | 2/58 | Hedback et al. | 122—32 |
| 2,982,263 | 5/61 | Villiers et al. | 122—32 |

FOREIGN PATENTS

| 675,583 | 7/52 | Great Britain. |
| 211,358 | 12/40 | Switzerland. |

OTHER REFERENCES

The Efficient Use of Steam, Oliver Lyle, published 1947 by His Majesty's Stationery Office, London, England. Pages 742, 743, 749 and 750 relied on.

SAMUEL LEVINE, *Primary Examiner.*

ABRAM BLUM, *Examiner.*